Figure 2:
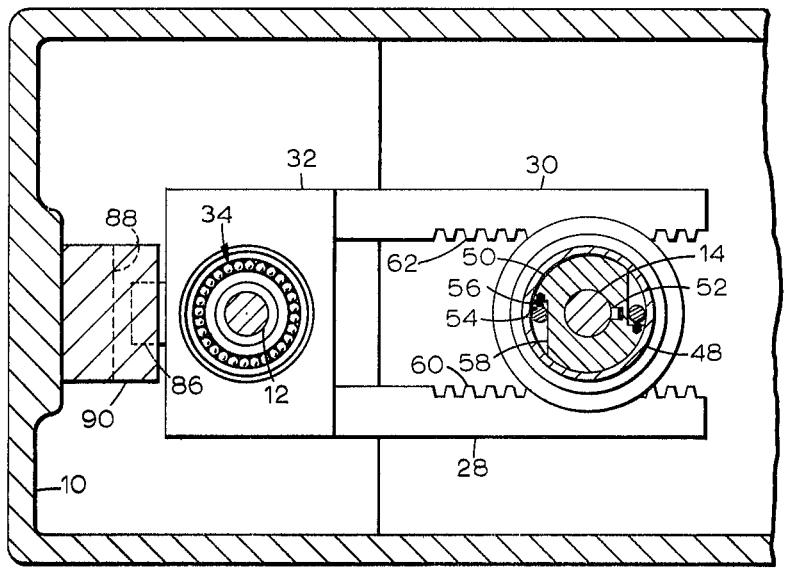

Sept. 14, 1965  H. R. UHTENWOLDT  3,205,725

MACHINE TOOL TRANSMISSION

Filed June 12, 1963

INVENTOR.
HERBERT R. UHTENWOLDT

BY
Howard Keiser
& Jack J. Earl
ATTORNEYS

United States Patent Office 3,205,725
Patented Sept. 14, 1965

3,205,725
MACHINE TOOL TRANSMISSION
Herbert R. Uhtenwoldt, Worcester, Mass., assignor to The Cincinnati Milling Machine Co., Cincinnati, Ohio, a corporation of Ohio
Filed June 12, 1963, Ser. No. 287,255
1 Claim. (Cl. 74—132)

The present invention relates to a machine tool transmission of the type particularly adapted for feeding the quill of a drilling machine during a drilling operation.

In drilling operations it is advantageous to provide a pulsating or incremental feed of the drill into the workpiece for the purpose of breaking the chips produced during the operation. A transmission mechanism for producing such a feed movement is shown and described in my prior U.S. Patent 3,071,990 issued on January 8, 1963. While the mechanism of the patent performs satisfactorily, it is somewhat complex to fabricate and assemble due to the number and shape of the parts of which it is comprised and consequently it is somewhat more expensive than is desirable. It is therefore the object of this invention to provide an improved transmission of the type described in the cited patent for producing a pulsating rotation of a shaft at a selected speed reduced from that of an input shaft, the transmission being greatly simplified and less expensive than previous mechanisms of this type. Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

The transmission of this invention includes a rotatable input shaft on which an eccentric section is formed. A single drive member is rotatably received over the eccentric section and this member has two rigid arms fixed thereto and extending therefrom parallel to and spaced apart from one another. The arms extend to diametrically opposed sides of an output shaft on which two overrunning, or one way drive, clutches are received. These clutches are each attached respectively to one and the other of the arms of the drive member such that as the arms are reciprocated transversely relative to the output shaft and in unison, the clutches are reciprocally rotated one way and the other. Both of the clutches are adapted to drive the output shaft in the same direction. Thus, as the arms are reciprocated by rotation of the input shaft and its eccentric section, the output shaft is rotated one way in increments alternately by one and the other of the clutches, the clutches being counter rotating since they are connected on opposite sides to the two arms which are reciprocated in unison. A clear understanding of this invention is obtainable from the following detailed description of the preferred embodiment of the transmission and references in the description are made to the attached drawings wherein FIG. 1 is a section view of a drilling machine transmission and FIG. 2 is also a section view of the same transmission taken on line 2—2 of FIG. 1.

Figure 1:
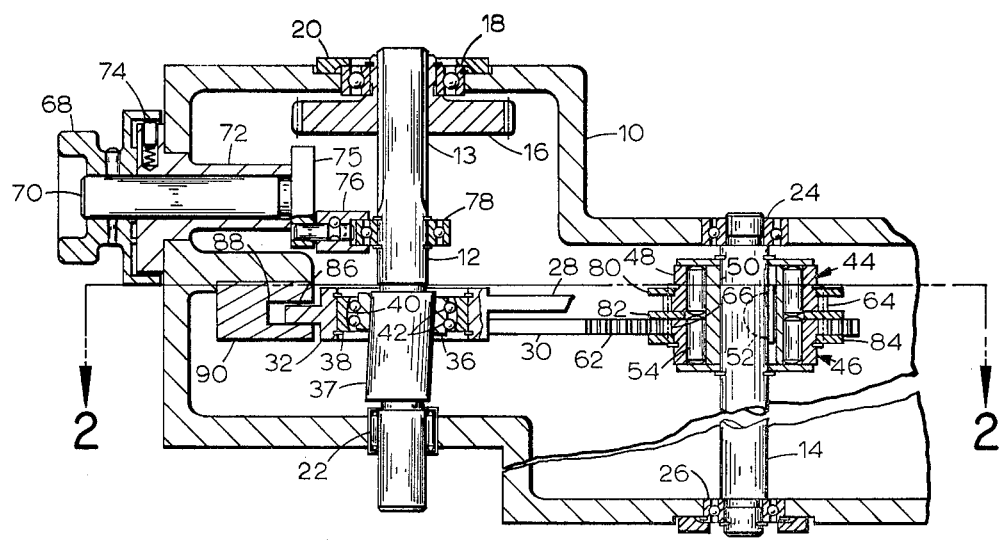

As shown in FIGS. 1 and 2, the mechanism is enclosed in a housing 10 through which an input shaft 12 and an output shaft 14 are rotatably received in spaced apart and parallel relation. The input shaft 12 has a splined end 13 over which a gear 16 is slidably received. The gear 16 is rotatable with the input shaft 12, being received in an antifriction bearing 18 that is held in the housing 10 by a retainer 20. The other end of the shaft 12 opposite the splined end 13 is received for rotation through a needle bearing 22 which allows axial movement of the shaft in the housing 10 relative to the shaft 12. The output shaft 14 is received in a fixed axial position in the housing 10 and is rotatable in a pair of bearings 24, 26.

Input rotational power is applied to the transmission by rotation of the gear 16 and shaft 12. The rotation of the shaft 12 is converted into pulsations of rotary drive which incrementally rotate the output shaft 14 in one direction. The drive pulses are produced by the reciprocation in unison of a pair of rigid arms 28, 30 which extend parallelly outward from a drive member 32 to pass on diametrically opposed sides of the output shaft 14. The arms 28, 30 are integral with the drive member 32 and, being rigid, do not move relative to one another. The drive member 32 and arms 28, 30 are oriented perpendicularly relative to the axis of rotation of the input shaft 12 and the drive member 32 is received over a double ball race bearing 34. The inner race member 36 of the bearing 34 is slidable along an eccentric section 37 of the shaft 12. The outer race member 38 of the bearing 34 has a single arcuate internal annular surface 40 on which both rows of the antifriction balls 42 of the bearing roll, the surface 40 being a section of a spherical surface. As shown, the eccentric section 37 has a cylindrical surface having a diameter larger than the diameter of the shaft 12 and the axis about which the surface is developed is slightly askew relative to the axis of rotation of the shaft 12. Thus the section 37 varies in eccentricity from one end to the other, the upper end being the least eccentric while its lower end is the most eccentric portion of its surface. Since the drive member 32 is perpendicular to the axis of rotation of the shaft 12 and not to the eccentric section 37, the plane of the paths through which the balls 42 move is slightly skewed from being perpendicular to the axis of rotation of the shaft 12 and the outer race 38 and its section of spherical surface 40 allows for this relationship without interference with the travel of the balls 42 or the free rotation of the shaft 12. As can be seen, when the shaft 12 is rotated, the drive member 32 and its arms 28, 30 will reciprocate transversely relative to the output shaft 14 due to the swing of the eccentric section 37.

The transverse reciprocation of the arms 28, 30 past the shaft 14 on either side thereof is converted into rotation of the shaft by the operation of two overrunning clutches 44, 46 which are received at a fixed axial position over the shaft 14. Each of the clutches 44, 46 is adapted to drive the shaft 14 in the same direction and to move relative thereto in the other direction. Both of the clutches 44, 46 are similarly constructed and are operated in the same manner. As shown in FIG. 2, each clutch is comprised of a ring 48, a bushing member 50 common to both and adapted by a key 52 to rotate with the shaft, a pair of rollers 54, and a pair of springs 56. The member 50 has two notches 58 formed therein in which the rollers 54 of the two clutches 44, 46 are received and biased by the springs 56 toward the narrow end of the spaced bounded by the notches 58 and the ring 48. When the ring 48 is rotated clockwise, as viewed in FIG. 2, the rollers 54 are caused to wedge in the narrow end of the spaces and to carry the member 50 and the shaft 14 clockwise with the ring 48. When the ring 48 is rotated in the counter-clockwise direction, the rollers 54 are shifted out of their wedging condition and the ring 48 turns free of the member 50. Thus, the clutches 44, 46 operate to drive the output shaft 14 in the clockwise direction only when either of the rings 48 is rotated clockwise. Rotation of the rings is provided by the reciprocation of the arms 28, 30 each of which has a toothed rack 60, 62 formed thereon and engaged with a gear 64, 66, respectively, fixed on the rings 48 of the clutches 44, 46.

As the arms 28, 30 reciprocate in unison the rings 48 of the two clutches 44, 46 are turned in opposite directions relative to one another since the arms 28, 30 are engaged on opposite sides of the clutches. It can be seen that as the arms 28, 30 are shifted rightward, the arm 30 rotates the clutch 46 clockwise, as viewed in FIG. 2, while the arm 28 rotates the clutch 44 counter-clockwise. The reverse is true while the arms 28, 30 are shifted leftward and the arm 28 produces the clockwise rotation. The section 37 is eccentric to one side and for each full revolution of the input shaft 12, a single reciprocal stroke of the arms 28, 30 out and back is produced. This produces two drive pulse motions of the shaft 14 due to the described arm linkages between the eccentric section 37 and the clutches 44, 46.

The length of reciprocal stroke of the arms 28, 30 transverse to the shaft 14 produced for each rotation of the input shaft 12 can be adjusted due to the axially varying eccentricity of the section 37 and the axial movement of the shaft 12. The axial position of the shaft 12 is determined by the angular setting of a dial member 68 which is fixed on the end of a shaft 70 that is journalled through a bushing 72. The bushing 72 contains a detent plunger 74 that is spring biased to engage the dial 68 to prevent its unintentional rotation. A flange 75 is formed on the inner end of the shaft 70 and an elongated shifter 76 is rotatably attached near the outer edge thereof. The shifter embraces a bearing 78 axially fixed on the shaft 12. As the dial 68 is rotated from the position shown, the shifter 76 is moved upward to carry the bearing 78 and shaft 12 upward. The drive member 32 is at a fixed location axially relative to the shaft 14 and does not move in the housing 10 when the shaft 12 is moved axially except transversely to the axis of the shaft 12. The arms 28, 30 are received between a set of disc members 80, 82, 84 at the clutches 44, 46 which are axially fixed on the shaft 14. At the side of the drive member 32 opposite the arms 28, 30, a tongue 86 is formed and it is embraced in a groove 88 in a fixed block 90 attached to the housing 10. The tongue 86 and groove 88 allow only a lateral shifting of the drive member as the eccentric section 37 is rotated and not a shift in the direction of the axis of the shaft 12. Therefore, an axial shift of the shaft 12 upward carries a more eccentric portion of the section 37 into the bearing 34 to increase the length of transverse reciprocal stroke of the arms 28, 30 toward and away from the shaft 14. Therefore the amount of rotation of the output shaft 14 is increased for each revolution of the input shaft 12 although the drive is still applied as two distinct pulses.

While the invention has been described in connection with one possible form or embodiment thereof, it is to be understood that the present disclosure is illustrative rather than restrictive and that changes and modifications can be resorted to without departing from the spirit of the invention or the scope of the claim which follows.

What is claimed is:
A machine tool transmission comprising:
(a) an input shaft rotatable on an axis and having an elongated eccentric section varying in eccentricity from end to end,
(b) a rotatable output shaft parallel to said input shaft and spaced therefrom, said output shaft and said input shaft being relatively axially movable,
(c) two overrunning clutches received on said output shaft, said clutches both adapted to rotate the output shaft unidirectionally and incrementally only in one direction when reciprocally rotated in said one direction and the other,
(d) a drive member including
(1) two spaced apart rigid arms extending parallelly therefrom,
(e) means for holding said drive member in a fixed axial position relative to said output shaft and for transverse reciprocation forth and back relative to said shafts and with said arms thereof embracing said output shaft therebetween,
(f) a double row ball bearing received in said drive member and around said eccentric section for relative sliding movement therealong, said bearing including
(1) an outer race with a single ball track of enlarged arcuate surface,
(g) means for connecting said arms to one and the other, respectively, of said clutches on opposite sides of said output shaft for rotation of the clutches reciprocally one way and the other when said drive member is reciprocated whereby said output shaft is rotated incrementally in said one direction and alternately by said clutches, and
(h) means for relatively axially moving said shafts to adjust the magnitude of transverse reciprocations of said drive member when said input shaft is rotated.

References Cited by the Examiner

UNITED STATES PATENTS

| | | | |
|---|---|---|---|
| 547,853 | 10/95 | Johansson | 74—600 |
| 986,092 | 3/11 | Sintz | 74—571 |
| 1,078,151 | 11/13 | Lamb | 74—132 |
| 1,220,196 | 3/17 | Comer | 74—132 |
| 1,732,760 | 10/29 | Mann | 74—571 |
| 2,584,227 | 2/52 | Potter | 308—194 |
| 2,653,064 | 10/53 | Heim | 308—194 |
| 2,683,026 | 7/54 | Preszler | 308—194 |
| 2,919,942 | 1/60 | Bechtel | 308—194 |
| 3,119,280 | 5/61 | Mann et al. | 74—571 |

FOREIGN PATENTS 421,290  5/47  Italy.

BROUGHTON G. DURHAM, *Primary Examiner.*